March 14, 1967  O. STIER  3,308,688
PROCESS AND APPARATUS FOR SHARPENING
THE TEETH OF SAW BLADES
Filed March 15, 1965  7 Sheets-Sheet 4
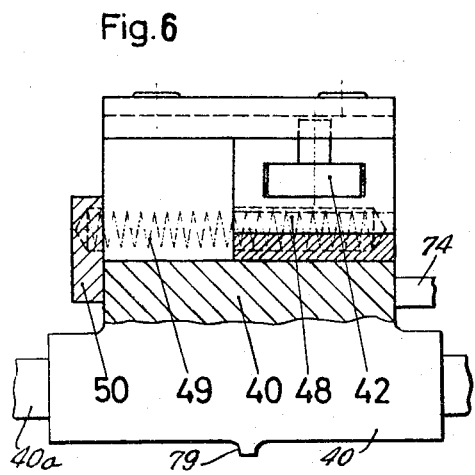
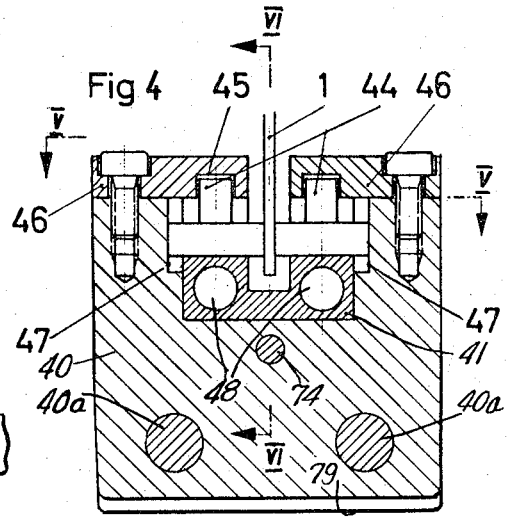
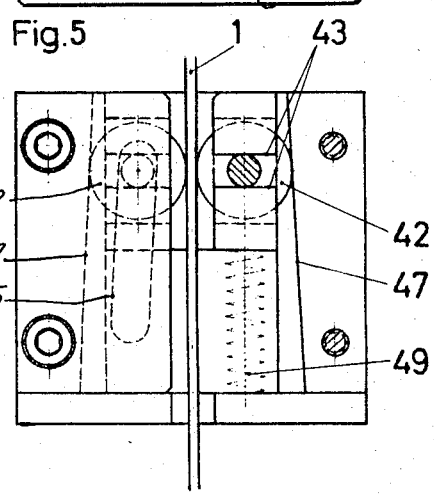
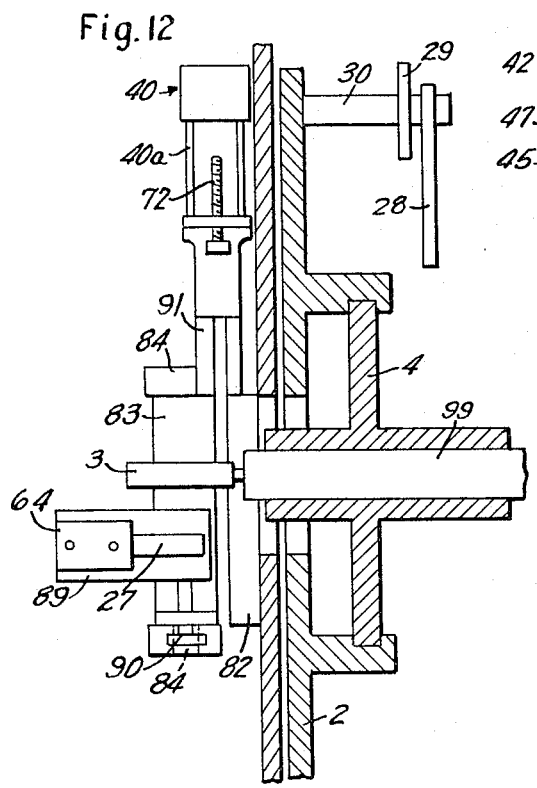
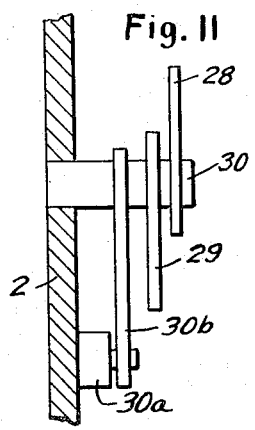

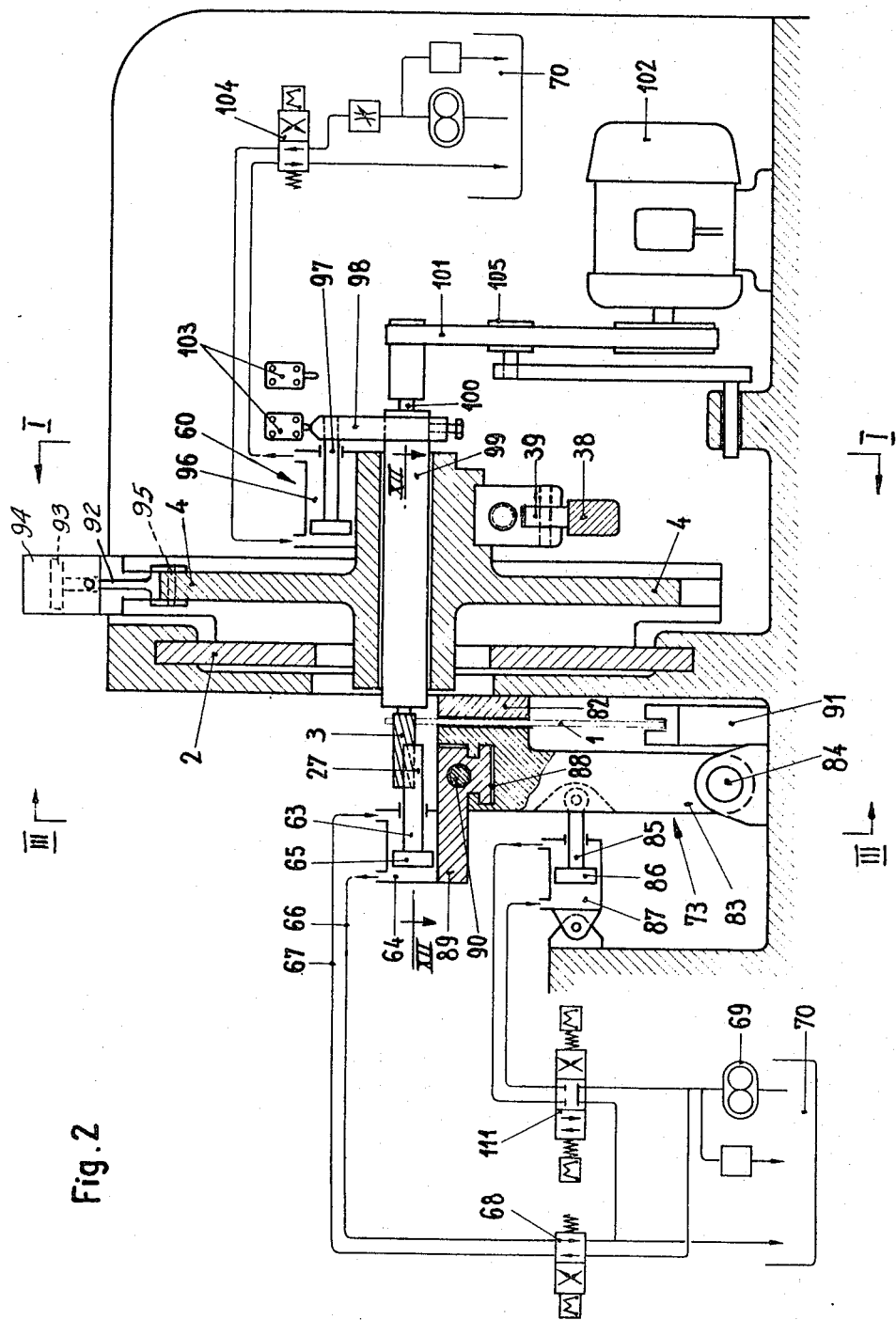

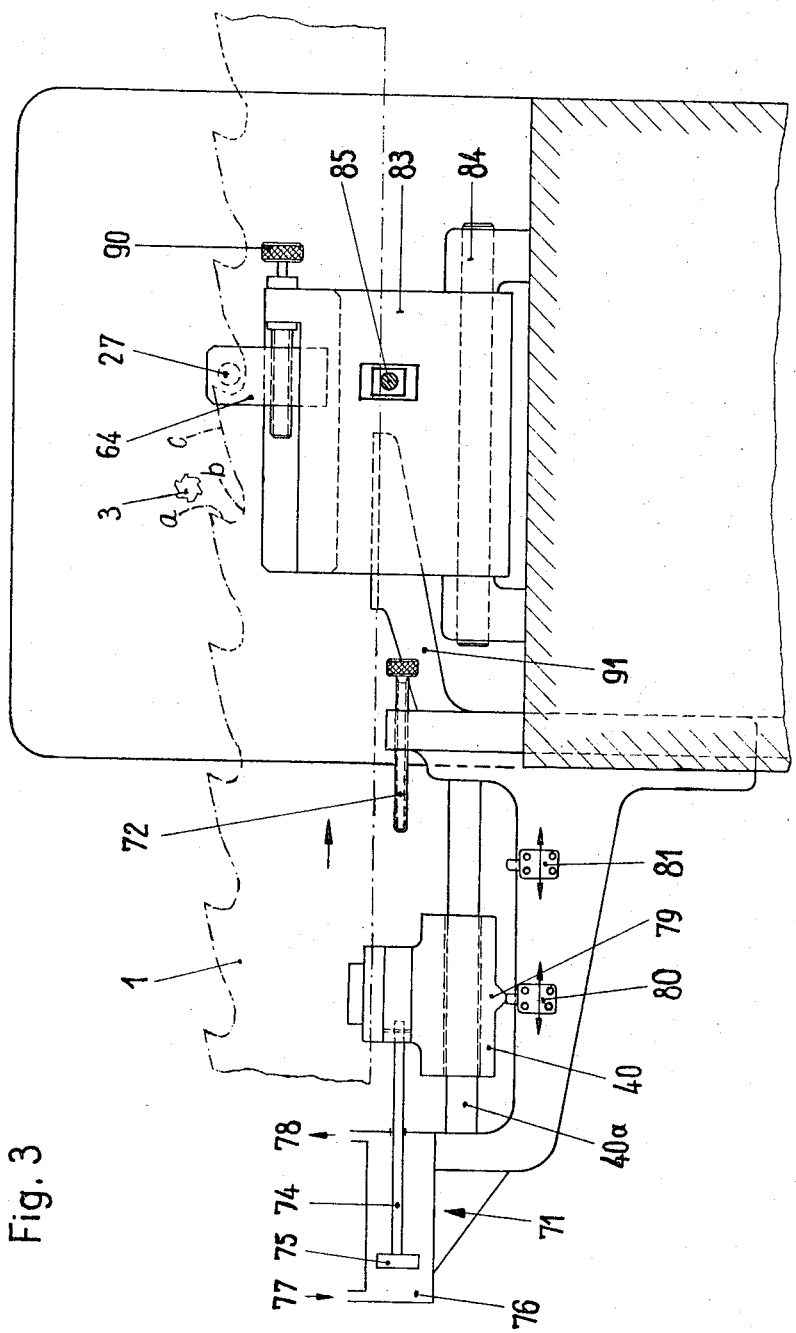

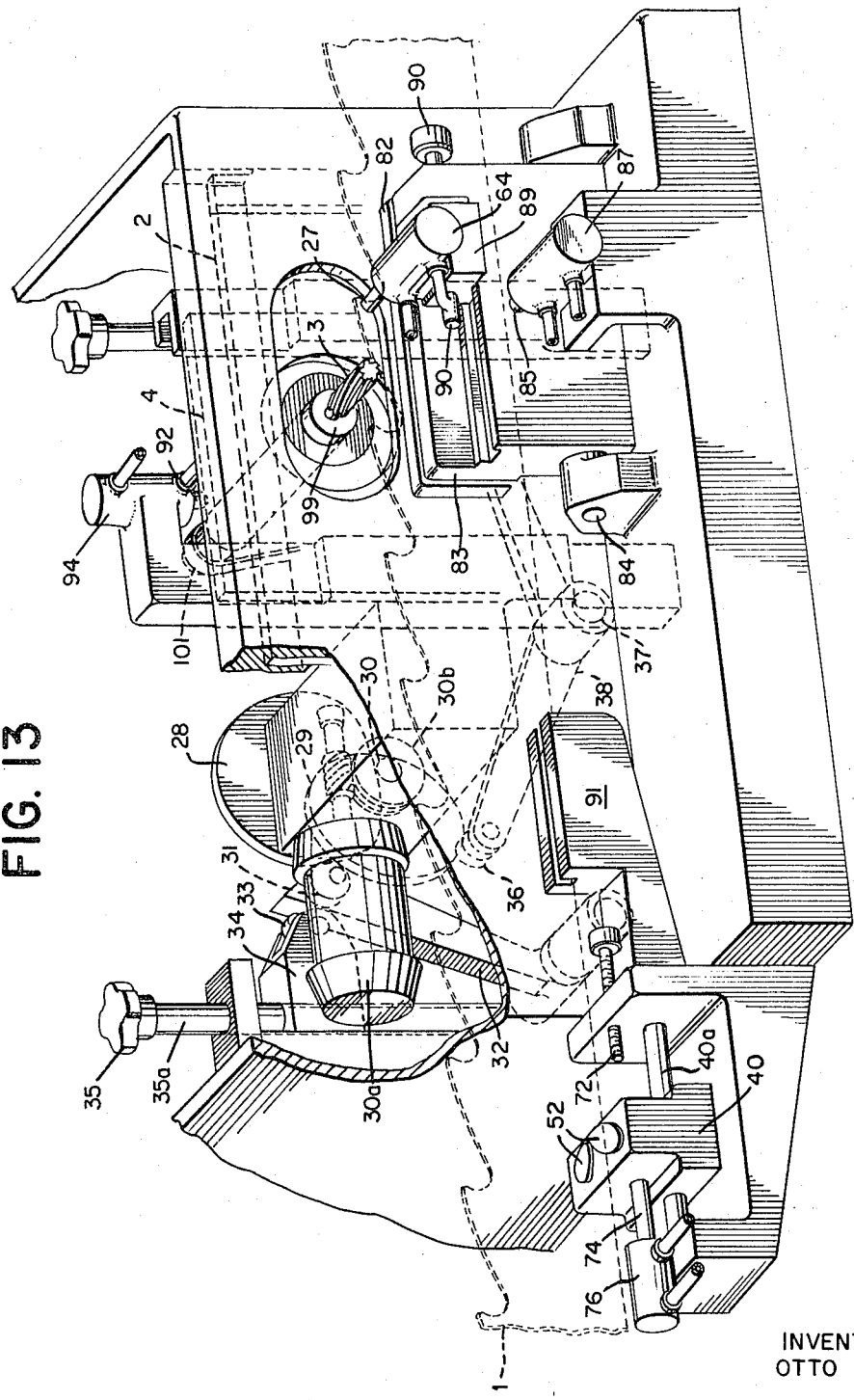

United States Patent Office 3,308,688
Patented Mar. 14, 1967

3,308,688
PROCESS AND APPARATUS FOR SHARPENING THE TEETH OF SAW BLADES
Otto Stier, Biberach an der Riss, Germany, assignor to Vollmer Werke Maschinenfabrik G.m.b.H., Biberach an der Riss, Germany
Filed Mar. 15, 1965, Ser. No. 439,831
Claims priority, application Germany, Mar. 17, 1964, V 25,629
17 Claims. (Cl. 76—43)

The present invention relates to the sharpening of the teeth of a saw blade.

The present invention can be used either in connection with the initial manufacture of the saw blade or for the purpose of maintaining the sharpness of the teeth of a saw blade which has been used.

Various processes and apparatus are already known for the purpose of sharpening the teeth of a saw blade. For example, according to one known process and apparatus the saw blade is moved in a direction opposite to that in which it moves during actual sawing and at the same time a rotary sharpening tool which has an axis perpendicular to the saw blade is moved back and forth in a direction perpendicular to the direction of movement of the saw blade itself, and these combined movements of the saw blade and the sharpening tool are correlated in such a way that the series of sawteeth are provided with the desired profile.

Each tooth gap is defined by the front cutting edge of one tooth, a throat edge of the tooth gap and the back edge of the next-following tooth which is situated forwardly of the tooth whose front cutting edge defines the tooth gap. These latter edges are sequentially and continuously operated upon by the rotary cutting tool while the latter turns in a direction in which it tends to roll along the edges which it engages. In other words the rotary sharpening tool is moved along the edges which it contacts in a direction opposite to that in which the tool would normally be moved for cutting purposes.

In this known process and apparatus the cutting tool which sharpens the saw teeth is advanced from one tooth gap to the next tooth gap in the same direction as that in which the saw blade moves during actual sawing operations when the saw cuts the material which it works on. The disadvantage of this type of process and apparatus is that when the rotary sharpening tool engages the front cutting edge of one tooth, the back edge of this latter tooth has already been sharpened, with the result that the sharpening tool leaves at the tip of the tooth a burr which projects from the front cutting edge at the tip thereof and forms substantially an extension of the front cutting edge, so that this burr diminishes the cutting efficiency of the saw blade.

It is also known to sharpen the teeth of a saw blade in a sequence from one tooth to the next which is in the same direction as that in which the saw blade moves during cutting of the material which it works on, while sharpening the saw tooth edges by means of a rotary sharpening disc which has an axis which is parallel to the saw blade. With this process the sharpening wheel is required to move in several passes along the edges of the whole sequence of teeth. During the last pass of the sharpening disc only that part of the back edge of each tooth is sharpened which is immediately adjacent to the front cutting edge thereof, so that in this way there will remain at the tip of each tooth a burr which extends in the cutting direction of the saw. Thus, while it is indeed possible with such a process and apparatus to obtain a burr of this latter type, nevertheless this process requires at least two separate passes of the cutting wheel along the teeth of the saw blade. Of course, with this process and apparatus it is immaterial whether the rotary sharpening wheel has an axis which is perpendicular to or parallel to the saw blade, or in fact whether a sharpening tool in the form of a grinding wheel, a rotary pencil-shaped grinding element, or a rotary, pencil-shaped milling cutter is used, the latter type of cutters of course having an axis which is perpendicular to that of the saw blade.

It is accordingly a primary object of the present invention to provide a process and apparatus capable of sharpening the teeth of a saw blade in one single operation aolng the tooth profile at each gap between a pair of adjoining saw teeth, while at the same time preventing the presence of any undesirable burrs at the tips of the teeth.

In particular, it is an object of the present invention to provide a process and apparatus of the above type wherein the required movements of the sharpening tool and saw blade are quite simple as compared to conventional processes and apparatus.

The objects of the present invention include the provision of a process and apparatus which will sharpen the back edge of a saw tooth after the front cutting edge thereof has been sharpened, so that the burr, which is provided during the sharpening of the front cutting edge of a tooth and which undesirably projects from the tip of the tooth substantially in the same direction as the front cutting edge thereof, is cut away during the sharpening of the back edge of the tooth. In this way is provided at the tip of the tooth a burr which extends in the cutting direction and thus does not undesirably reduce the efficieincy of the cutting action of the saw.

A further object of the present invention is to provide for an apparatus of the above type a blade-advancing structure which is capable of advancing a saw blade by a distance equal to the distance between the tips of two adjacent saw teeth during the return movement of a sharpening tool back to an initial starting position.

It is furthermore an object of the present invention to provide an apparatus which is capable of sharpening the front cutting edges of the saw teeth even in the case where these front cutting edges are either inclined rearwardly with respect to the cutting direction or are of a concave configuration.

In addition, it is an object of the present invention to provide for an apparatus of the above type a blade-advancing means which is not only capable of shifting a blade by a distance equal to the distance between the tips of two adjacent saw teeth at the end of each sharpening operation, but which in addition is capable of reliably maintaining the saw blade properly centered during the entire advancing movement.

The process of the present invention primarily includes the steps of maintaining the saw blade stationary while it is acted upon by the sharpening tool, moving the sharpening tool, which rotates about an axis which is perpendicular to the saw blade and in a direction where the sharpening tool tends to roll along the edge which it engages, along the edges of a tooth gap, that is along the point edge of one tooth, which is the cutting edge thereof, the throat edge of the tooth gap, and the back edge of the adjacent tooth, and cutting the gaps in the sequence which is in the direction opposite to that in which the saw blade moves during actual sawing.

The apparatus of the invention includes a moving means for moving the rotary sharpening tool along the edges of each tooth gap in the sequence referred to above, and in addition this apparatus of the invention includes a blade-clamping means which holds the blade stationary while it is contacted by the sharpening tool and a blade-advancing means which advances the saw blade through a distance equal to the distance between the tips of two adjacent sawteeth in a direction in which the saw blade moves during cutting of work material thereby, so as to locate the next tooth gap in a position to receive the rotary sharpening tool. The moving means which moves the sharpening tool includes a longitudinal carriage which is shiftable longitudinally of the saw blade and a transverse carriage which carries the tool and which is carried by the longitudinal carriage for movement transversely thereof. A camming assembly cooperates with these carriages for controlling the movements thereof in such a way that the rotary sharpening tool will move along a path coincident with the tooth profile, that is the edges of a tooth gap.

The invention is illustrated by way of example in the accompanying drawings which form part of the application and in which:

FIG. 2 is a schematic transverse section of the apparatus shown in FIG. 1, taken along the line II—II of FIG. 1;

FIG. 3 is a schematic front elevation of the apparatus shown in FIG. 1, taken along line III—III of FIG. 2;

FIG. 4 is a schematic transverse section of an advancing means according to the invention;

FIG. 5 is a schematic partly sectional plan view taken along line V—V of FIG. 4;

FIG. 6 is a schematic section taken along line VI—VI of FIG. 4;

Figure 7:
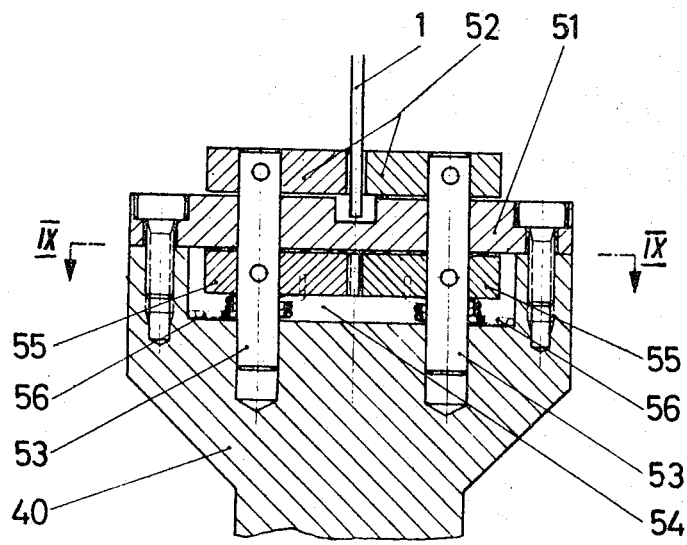
FIG. 7 is a schematic transverse section of another embodiment of an advancing means according to the invention.
Figure 9:
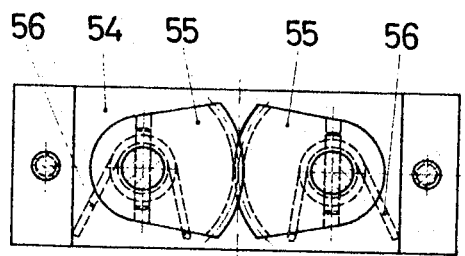
Figure 10:
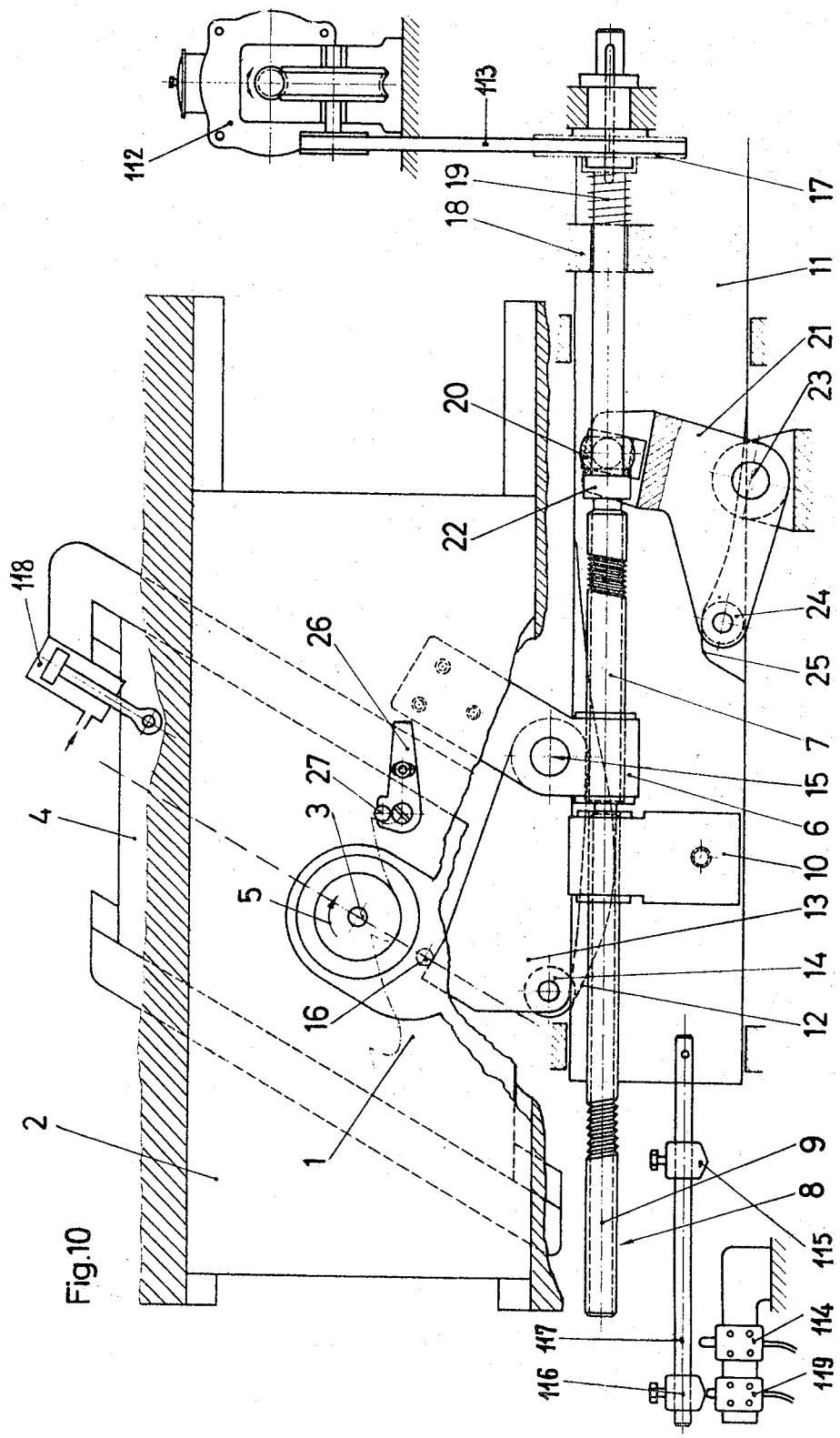

FIG 9. is a schematic section taken along line IX—IX of FIG. 7;

FIG. 10 is a schematic fragmentary partly sectional rear elevation of another embodiment according to the invention in which the individual operations are carried out by hand, and which is provided only for a specific tooth profile and tip-to-tip distance of the teeth; and FIG. 11 schematically illustrates a drive for a camming assembly;

FIG. 12 is a fragmentary schematic sectional plan view taken along line XII—XII of FIG. 2 in the direction of the arrows; and FIG. 13 shows the structure in a perspective view.

Figure 1:
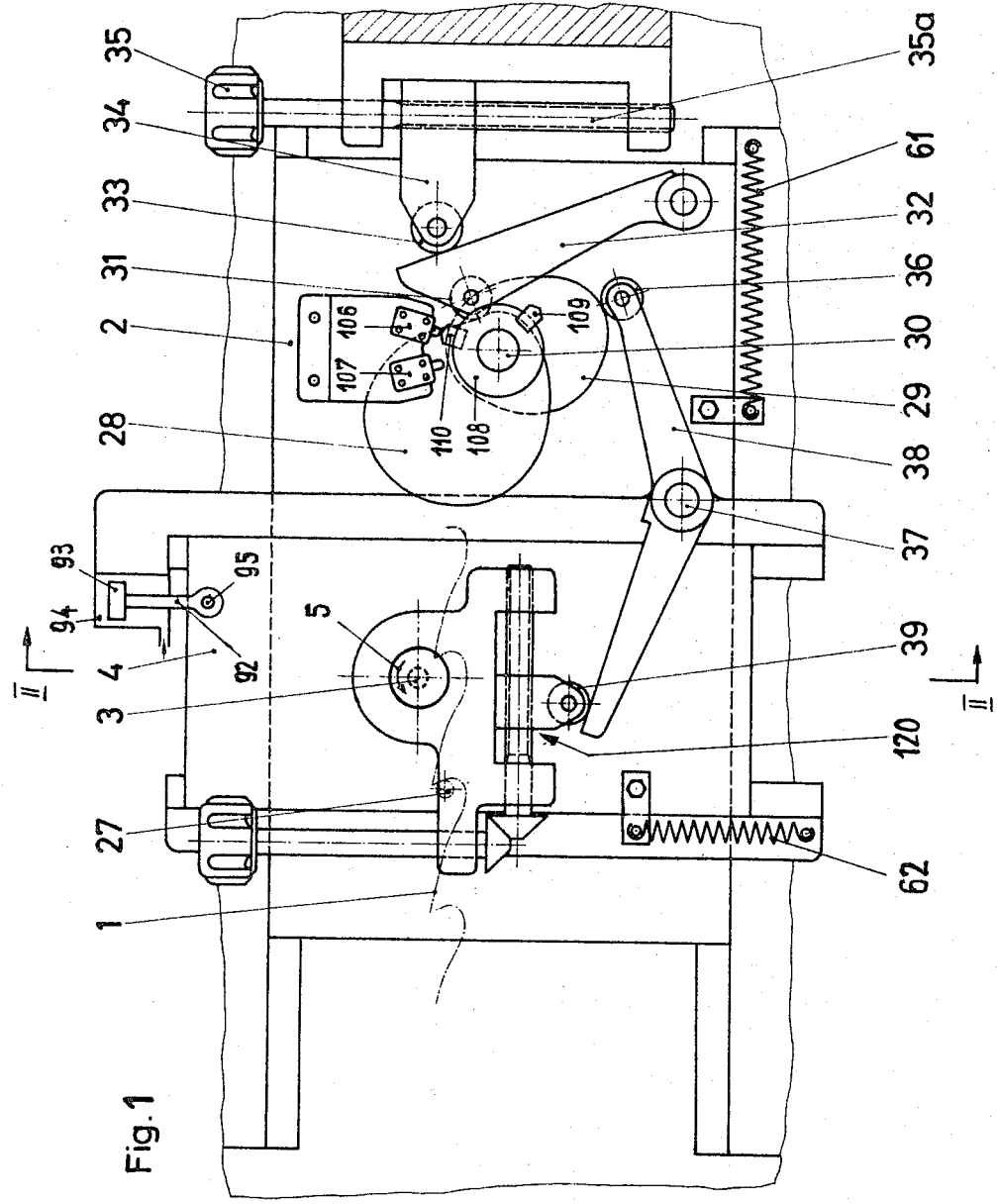
FIG. 1 is a schematic fragmentary partly sectional rear elevation of one possible apparatus in accordance with the present invention for carrying out the process of the present invention, taken along line I—I of FIG. 2.

Referring now to FIG. 1, there is illustrated therein a longitudinal carriage 2 which is supported by the machine frame in suitable guide ways for shifting movement longitudinally of the elongated saw blade 1 whose tooth edge is fragmentarily indicated in dot-dash lines. This longitudinal carriage 2 carries a transverse carriage 4 which is movable parallel to the plane of the saw blade 1 and transversely to the direction of movement of the carriage 2 and which carries the rotary sharpening tool 3 adapted to be reciprocated back and forth along its axis by a device generally designated by the reference numeral 60 which will be described in detail below.

The illustrated rotary sharpening tool 3 takes the form of an elongated milling cutter of pencil-shaped configuration, this rotary sharpening tool having an axis which is perpendicular to the saw blade 1. The rotary tool 3 is driven by a motor 102 which rotates the tool 3 in the direction of the arrow 5 shown in FIG. 1, so that the cutting surface of the tool 3 tends to roll along the edge which is sharpened by the tool 3. The diameter of the tool 3 is smaller than the smallest radius of curvature along the tooth profile which is sharpened by the tool 3. The longitudinal carriage 2 and the transverse carriage 4 are respectively movable along paths which include between themselves an angle of less than 90 degrees.

The moving means of the two carriages 2 and 4 includes a camming assembly made up of a rotary shaft 30 carried and supported for rotation by the longitudinal carriage 2 which carries, as indicated schematically in FIG. 11, a suitable motor 30a which by way of a belt 30b drives the cam shaft 30. This cam shaft 30 carries a pair of cams 28 and 29 which are fixed to the shaft 30 for rotary movement therewith.

The periphery of the cam 28 engages a stationary roller 31 supported for rotary movement at the free end of a lever 32 which is pivotally carried by the machine frame. The free end of the lever 32 engages a roller 33 situated at the side of the lever 32 opposite from the cam 28, and this roller 33 is adjustable longitudinally of the lever 32 so as to determine the inclination of the latter and thus the position of the roller 31 which is engaged by the cam 28. For this purpose the roller 33 is supported for rotary movement by an arm 34 which is carried by a threaded spindle 35a capable of being manually turned by a hand wheel 35 fixed to the spindle 35a. By extending through a threaded portion of the arm 34 which is guided for movement along the spindle 35a but which cannot turn with respect thereto, turning of spindle 35a will change the elevation of the arm 34 and the roller 33 can be adjusted so as to determine in this way the position of the roller 33 which is engaged by the cam 28. A spring 61, one end of which is secured to the longitudinal carriage 2 and the other end of which is secured to the machine frame, acts on the carriage 2 in order to urge the latter to the right, as viewed in FIG. 1 so as to maintain the cam 28 at all times in engagement with the roller 33.

The other cam 29 controls through a suitable motion-transmitting structure the movement of the transverse carriage 4. This motion-transmitting structure includes a lever 38 which is pivotally supported by a pin 37 carried by the carriage 2 and which carries a cam follower roller 36 which engages the periphery of the cam 29. The other arm of the lever 38 engages a roller 39 which is supported for rotary movement by the carriage 4, and a spring 62, one end of which is secured to the carriage 4 and the other end of which is secured to the longitudinal carriage 2, acts on the carriage 4 to maintain the roller 39 in engagement with the lever 38 and the roller 36 in engagement with the cam 29.

Thus, the moving means which controls the movement of the tool 3 relative to the stationary blade 1 includes a camming assembly which controls the relative movement of the carriages 2 and 4 with respect to each other and to the machine frame.

In the embodiment of FIG. 1 there is also a stop pin 27 movable into and out of each tooth gap for engaging the front cutting edge which has just previously been sharpened. In this way, the pin 27 serves to determine the extent of movement of the blade 1 by a blade-advancing means which is described below and which shifts the blade only during the return movement of the tool 3 to its initial position after the sharpening operation has been completed.

Referring to FIG. 2, the stop pin 27 is formed by an extension of a piston rod 63 adapted to be reciprocated in a hydraulic cylinder 64, the piston rod extending through the front end of the cylinder 64 facing the saw blade 1. For the purpose of reciprocating the piston 65 attached to the piston rod 63, the cylinder 64 is connected with hydraulic conduits 66 and 67 which may be alternately connected with a geared pump 69 of a source of pressurized fluid, generally indicated by the reference numeral 70, through a solenoid-operated reversing valve 68.

With the embodiment of FIGS. 1 to 3, during rotation of the shaft 30, the cam 28 cooperates with the roller 31 in order to determine the longitudinal shifting of the carriage 2, while at the same time the two armed lever 38 has its inclination controlled by the cooperation of the cam 29 with the roller 36, so that the lever 38 acts on the roller 39 to determine the movement of the carriage 4. The configurations of the cams 28 and 29 are such that during rotation of the cam shaft 30 the cutter 3 will move along the profile of each tooth gap, sequentially along the front cutting edge *a* of one tooth, the throat edge *b* of the tooth gap, and then along the back edge *c* of the tooth in front of the cutting edge of said one tooth, as indicated in FIG. 3. By adjusting the position of the arm 34, it is possible to determine the starting position of the cutter 3 longitudinally of the saw blade. The starting position of the cutter 3 may be adjusted vertically by a means 120 which is similar to the means formed by the parts 34, 35 and 35a and which serves to adjust the roller 39. Thus, as may be seen from FIG. 1, the means 120 includes an arm carrying the roller 39 and threadedly mounted on a horizontal rotary spindle which by a bevel-gear transmission can be manually turned by way of a suitable handle similar to the handle 35 and accessible to the operator.

The blade-advancing means, one embodiment of which is illustrated in FIGS. 4 to 6, includes a support assembly 40 capable of being shifted back and forth longitudinally of the blade 1 through a structure 71 which is described below and illustrated in FIG. 3, the support assembly 40 being capable of having the extent of shifting movement of the blade 1 determined either by the pin 27 or by a stop 72 which, as shown in FIG. 3, is an adjustable bolt and against which the support assembly 40 abuts in its forward end position in the advancing direction of the saw blade 1. This assembly 40 includes an outer body in which is situated a slide block 41 of substantially U-shaped cross section, this block 41 being guided for central longitudinal movement with respect to the supporting assembly 40 and serving in a manner described below to centrally position the blade 1 with the back edge thereof extending into the block 41 centrally with respect thereto. Thus, this slide block 41 has a pair of upwardly directed side extensions between which the blade 1 is centrally positioned.

A pair of clamping rollers 42 are respectively situated on opposed sides of the blade 1 to respectively engage the opposed faces of the blade 1, and in the clamping position shown in FIG. 5 peripheral portions of the rollers 42 which are directed toward each other respectively press against the blade 1 so as to clamp the latter. These rollers 42 respectively have coaxial shafts 44 which extend upwardly into a pair of aligned transverse grooves formed in the slide block 41, so that these grooves 43 cooperate with the rollers 42 to guide the latter for movement transversely with respect to the blade 1. It is this cooperation of the block 41 with the rollers 42 which guarantees the central positioning of the blade 1 with respect to the entire blade-positioning means shown in FIGS. 4–6.

The shafts 44 respectively extend upwardly through the grooves in the slide block 41 into elongated grooves 45 which are formed respectively in the undersides of a pair of cover plates 46 which form part of the assembly 40 and which are respectively fixed thereto by suitable bolts and the like, as indicated in FIGS. 4 and 5. These cover plates 46 are spaced from each other so that the blade 1 can extend therebetween into the space between the side extensions of the slide block 41. The grooves 45 are spaced from the inner side edges of the cover plates 46 and they diverge from each other symmetrically with respect to the plane occupied by the blade 1, these grooves diverging from each other in the direction in which the blade 1 is displaced by the blade-advancing means of FIGS. 4–6 when the entire assembly shown therein is shifted in the blade-shifting direction.

The peripheral portions of the rollers 42 which are directed away from the blade 1 respectively engage guide surfaces 47 of the member 40, these roller guiding surfaces extending parallel to the grooves 45 and thus also diverging away from each other in the direction of shifting movement of the blade 1. Thus, during movement of the roller shafts 44 along the grooves 45, respectively, the peripheries of the rollers 42 will roll along the surfaces 47 which are respectively parallel to the grooves 45.

As is particularly apparent from FIGS. 4 and 6 the slide block 41 is provided with a pair of bores 48 which respectively receive a pair of compressed coil springs 49 whose ends distant from the block 41 engage a projection 50 fixed to and forming part of the assembly 40. These springs 49 serve to shift the block 41 in a direction opposite the direction in which the grooves 45 diverge from each other, so that the springs 49 together with the lateral positioning of the rollers 42 by the guide surfaces 47 determined the end position of the slide block 41 when the blade 1 is clamped by the clamping rollers 42.

When the assembly 40 is shifted in the blade-moving direction, which is the direction in which the guide surfaces 47 and grooves 45 diverge from each other, the rollers 42 will remain clamped against the blade 1 to shift the latter together with the assembly 40. During return movement of the assembly 40 in the direction in which the grooves 45 converge toward each other, the rollers 42 tend to move in opposition to the springs 49 along the diverging portions of the grooves 45 and the guide surfaces 47, so that these rollers release the blade 1 enabling the assembly 40 to be returned to its initial position.

Figure 8:
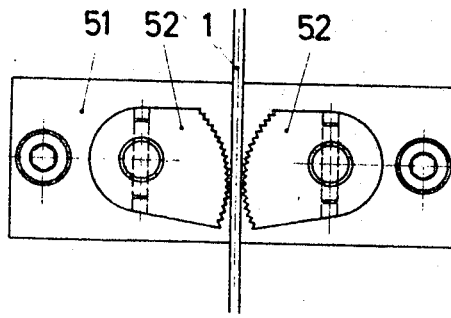
FIG. 8 is a schematic top plan view of the advancing means according to FIG. 7.

Referring now to FIGS. 7–9, the blade-advancing means illustrated therein also includes an assembly 40 which is shiftable longitudinally with respect to the blade 1. In this case, the body 40 is formed at its upper end with an upwardly directed recess 54 across which a bridge member 51 extends, this member 51 being fixed to the body of the assembly 40. This bridge member or cover plate 51 is situated directly beneath a pair of clamping levers 52 which are supported for turning movement in a plane perpendicular to the saw blade 1. The ends of the clamping levers 52 which are directed toward each other are curved in the manner shown most clearly in FIG. 8 and are provided with suitable teeth so that during movement of the assembly 40 in one direction the clamping levers 52 will tightly clamp the blade 1 while during movement of the assembly 40 in the opposite direction these clamping levers 52 will automatically release the blade 1. In order to pivotally support the clamping levers 52 they are fixedly carried by a pair of shafts 53 which extend through suitable openings in the cover plate 51 and into bores in the body of the assembly 40, the lower ends of the shafts 53 being shown extending into these latter bores in FIG. 7.

In order to center the blade 1 with respect to the entire assembly 40, there are situated in the recess 54 a pair of gear sectors 55 which are of equal radii, respectively, and which are at all times in mesh with each other, these gear sectors being fixedly carried by the shafts 53, for rotary movement therewith. A pair of torsion springs 56 are respectively coiled about the shafts 53, and engage at their inner ends edges of the sectors 55 so as to tend to turn the latter in opposite directions. At their outer ends, the coil springs 56 engage stationary surfaces at the inside of the upwardly directed side extensions of the body of the assembly 40, as is shown most clearly in FIG. 9. Therefore, the right spring of FIG. 9 tends to turn the right sector 55 in a clockwise direction, while the left spring 56 tends to turn the left sector 55 in a counterclockwise direction, and the result is that the clamping levers 52 tend to turn with the gear sectors, respectively, so that the torsion springs 56 urge the clamping levers 52 into their clamping positions with the meshing sectors 55 acting to maintain the levers 52 at all times at symmetrical positions with respect to the blade 1 so as to maintain the latter properly centered.

During return of the blade-advancing means of FIG. 7 to 9 back to its starting position, the blade 1, which is maintained stationary by a blade-clamping means, generally indicated in FIG. 2 by the reference numeral 73 and described in greater detail below, will be incapable of returning with the assembly 41, and the clamping levers 52 will automatically slide with respect to the exrior surfaces of the blade 1 in a direction tending to turn the clamping levers apart from each other so that they release the blade 1. Movement of the assembly in the opposite direction will only serve to more tightly press the levers 52 against the blade 1 so that the latter will now be shifted together with the assembly 40. The relationship between components shown in FIGS. 1–3 is indicated in FIG. 12.

Referring to FIG. 3, the structure 71 which is provided for reciprocation of the support assembly 40 of the advancing means, comprises a piston rod 74 connected to the assembly 40 and having secured to its other end a piston 75 which is disposed in a hydraulic cylinder 76. For the purpose of reciprocating the piston 75 and, consequently, the assembly 40 which slides on a guide rail 40a, the ends of the hydraulic cylinder 76 can alternately be connected to the pump 69 (FIG. 2) through conduits 77 and 78, respectively, shown schematically in FIG. 3 at the ends of the cylinder 76. A projection 79 is formed on the underside of the assembly 40, which projection serves for actuating an electric switch 80 and 81, respectively, in each of the two end positions of the assembly 40. The function of these switches is explained later on.

The blade-clamping means generally indicated by the reference numeral 73 in FIG. 2 which clamps the saw blade so that it can be worked on by the cutter 3 after the saw blade 1 has been advanced in sawing direction by a distance equal to the distance from the tip of one tooth to the tip of the adjacent tooth through the assembly 40, comprises a clamping jaw 82 which is fixed to the machine frame and a clamping jaw 83 arranged on the other side of the saw blade 1 and opposite the clamping jaw 82, the clamping jaw 83 being pivotable at the machine frame about an axis parallel to the plane of the saw blade. In order to press the clamping jaw 83 against the saw blade, a piston rod 85 is pivotally connected to the clamping jaw 83, the piston 86 of said piston rod being disposed in a hydraulic cylinder 87. As shown in FIG. 2, the hydraulic cylinder 64 for reciprocating the stop-pin 27 is arranged on the upper end of the clamping jaw 83 and secured to a carriage 89 which can be displaced in a guideway 88 formed in the clamping jaw 83 parallel to the direction of the saw blade 1 by means of a manually operable threaded spindle 90 in order to adjust the pin 27 such that the first gap of the saw blade 1 to be worked on is accurately adjusted with respect to the milling cutter 3.

In order to maintain the saw blade 1 at the same height even if the blade-clamping means 73 is released, a support for the saw blade is provided which has the form of a supporting arm 91 (FIG. 3) projecting from the machine frame.

Referring to FIG. 1, a piston rod 92 is pivotally connected at 95 to the transverse carriage 4. By means of the piston 93 which is connected to said piston rod and displaceable in a hydraulic cylinder 94 arranged on the longitudinal carriage 2, the transverse carriage 4 can be lifted with the rotary tool 3 against the action of the spring 62 to an upper position determined by a stop, where the rotary tool 3 does not interfere with the teeth during the return movement of said tool to its initial position, the return movement being controlled by camming means 28, 29.

The means for reciprocating the rotary tool 3 along its axis, which means is generally indicated in FIG. 2 by reference numeral 60, comprises a dual-acting hydraulic cylinder 96, whose piston rod 97 is connected with an actuating arm 98 which is clamped on a spindle sleeve 99 which is mounted in the transverse carriage 4 so as to be longitudinally slidable but not rotatable. During reciprocation of the piston rod 97 the actuating arm 98 and thus the spindle sleeve 99 and the rotary tool 3 are moved back and forth along their axis. Reciprocation of the piston rod 97 is controlled by two electric switches 103 which are actuated by the arm 98 in the end positions of the piston rod 97 and which alternately connect the ends of the hydraulic cylinder 96 to the pressure-fluid source 70 by means of a solenoid-operated reversing valve 104.

Spindle 100 carrying the rotary tool 3 is driven by a motor 102 via a driving belt 101 tensioned by means of tension pulley 105. The tension pulley 105 ensures that during the movements of the tool 3 controlled by the cams 28 and 29 the belt is at all times appropriately tensioned.

Referring to FIG. 1, there is arranged on the shaft 30, in addition to the cams 28 and 29 which control the movements of the transverse carriage 4 and the longitudinal carriage 2, a disc 108 having two dogs 109 and 110 which are offset in circumferential and axial direction and which are provided for actuating two electric switches 106 and 107 disposed on the longitudinal carriage 2. When one tooth gap has been sharpened by the tool 3, the switch 107 actuated by the dog 109 serves to actuate a solenoid-operated valve (not shown) in such a manner that pressurized fluid is introduced into the hydraulic cylinder 94 in order to lift the transverse carriage 4 against the action of the spring 62 before the tool 3 returns to its initial position. By operating the switch 107 also a solenoid-operated valve 111, is actuated to disconnect the hydraulic cylinder 87 (FIG. 2) which presses the clamping jaw 83 against the saw blade for clamping action, from the pressure-fluid source 70 and in order to relieve the hydraulic cylinder of the pressure. Furthermore, switch 107 operates solenoid-operated valve 68 so that pressurized fluid is introduced into the forward end of the cylinder 64 via the conduit 67, to withdraw the stop-pin 27 from the tooth gap, and finally, switch 107 operates a solenoid-operated valve (not shown) so as to introduce pressurized fluid into the left-hand end of cylinder 76 (FIG. 3) via the conduit 77 for the purpose of shifting the assembly 40 for advancing the saw blade by a distance equal to one tooth to the right as shown in FIG. 3, that means in the cutting direction of the saw blade. When the assembly 40 is shifted, the switch 80 is released, thereby the solenoid-operated valve 68 is by means of a time-delay relay actuated after an adjustable interval in order to feed pressurized fluid into the conduit 66 in order to advance the pin 27 into the next tooth gap. When the assembly 40 has reached its end position in the advancing direction of the saw blade, projection 79 operates the switch 81 which in turn actuates the solenoid-operated valve 111 so as to connect the pressure-fluid source 70 again to the space of the hydraulic cylinder 87 on the rearside of the piston, so that the saw blade 1 is clamped in the new position to receive the tool. By operating the switch 81, also the device 71 is returned after a short interval, in which the saw blade 1 has again been clamped by the clamping jaw 83, so as to bring the assembly 40 back to its initial position.

When the dog 110 has reached the switch 106, as shown in FIG. 1, the latter de-energizes the solenoid-operated valve so as to disconnect the pressure-fluid source 70 from the cylinder 94 and to relieve said cylinder of the pressure. Thus the transverse slide 4 with the rotary tool 3, which has now been returned to its initial position, goes down until the roller 39 rests again on the lever 38. The tool 3 is thus in the initial position for the next operating cycle which is controlled with the aid of cams 28 and 29.

The construction described above is shown pictorially in FIG. 13.

Referring now to FIG. 10 there is shown a second embodiment of the invention which is manually controlled and designed for sharpening saw blades having front cutting edges that are either inclined rearwardly with respect to the cutting direction or are of a concave configuration. In FIG. 10 the parts which correspond to parts of the device shown in FIGS. 1 to 3 have been designated by the same reference numerals.

In the embodiment according to FIG. 10 the carriage 2 is, in order to be longitudinally shifted, fixed to a nut 6 which is threadedly carried by a threaded portion 7 of a rotary spindle 8 which extends parallel to the longitudinal direction of movement of the carriage 2. This rotary spindle 8 has a second threaded portion 9 which is different from the threaded portion 7 to an extent which will increase the distance between a nut 10 carried by the threaded portion 9 and the nut 6 during rotation of the spindle 8 in one direction. Although the threaded portion 9 could take the form of a thread wound in the same direction as the threaded portion 7 of the spindle 8 but having a pitch sufficiently different to provide the increase in the distance between the nuts respectively carried by these threaded portions, in the illustrated example the threaded portion 9 is wound oppositely from the threaded portion 8 so that one of these threaded portions is a right hand thread while the other threaded portion is a left hand thread. A nut 10 is threaded onto the threaded portion 9 of the spindle 8 and this nut 10 is fixed with an elongated template 11 which is supported by the machine frame for longitudinal shifting movement in a direction parallel to the spindle 8 and the direction of shifting movement of the carriage 2 which is also supported by the machine frame, in suitable guide ways, for longitudinal shifting movement.

A camming assembly is provided for controlling the shifting movement of the carriages relative to each other, and to the machine frame, and this camming assembly includes the camming edge 12 formed at the upper edge of the template 11. A lever 13 rotatably carries a follower roller 14 which engages the camming edge 12. The follower roller 14 is carried by the lever 13 adjacent a lower edge thereof, and the lever 13 is fixedly connected with the nut 6 by being pivotally supported on a pivot pin 15 which is fixedly carried by the nut 6 which is of course fixed with the longitudinal carriage 2, so that in this way the lever 13 is constrained to move with the carriage 2. The front or upper edge of the lever 13 extends beneath and engages a pin 16 which is fixedly carried by the carriage 4 which supports the rotary tool 3 in a manner similar to that of the embodiment shown in FIGS. 1 to 3. As may be seen from FIG. 10, the tool 3 extends through an elongated opening formed in the carriage 2 which is situated in front of the carriage 4, whereas the lever 13 is situated behind the carriage 4. The carriage 4 carries in a suitable opening an electrical motor which drives the tool 3. The carriage 2 is provided with the ways which guide the carriage 4 for movement transversely of the carriage 2.

The rotary threaded spindle 8 is supported not only for rotary movement but also for axial movement in a direction opposite to that in which the saw blade 1 moves during cutting of material by the saw blade, the machine frame having suitable bearings which support the spindle 8 for rotary and axial movement. One end of the spindle 8 carries a driving pulley 17, and between the pulley 17 and a bearing 18, of the machine frame, which contributes to the support of the spindle 8 for rotary and axial movement, is situated a compressed coil spring 19 which is coiled about the spindle 8 and presses at one end against the bearing 18 and at its other end against the pulley 17, so that the spring 19 urges the spindle 8 toward the right, as viewed in FIG. 10.

In order to axially move the spindle 8, a sleeve 20 is carried by the spindle 8 on a smooth-surfaced portion thereof, and one arm of a lever 21 is by means of a slide ring pivotally connected with the ring or sleeve 20 which at one of its ends engages a collar member 22 which is rigidly fixed with the spindle 8. The two-armed lever 21 is pivotally supported at 23 on the machine frame, so that the lever 21 has a stationary pivot axis. The second arm of the lever 21 supports for rotation a cam follower roller 24 which engages a camming edge 25 formed along the lower edge of the longitudinally shiftable template 11, this cam 25 forming also part of the camming assembly which controls the movement of the carriages.

In order to stop the blade 1 after it has been moved, in a manner described below, through a distance equal to one tooth, so as to situate the next tooth gap in a position to receive the tool 3, a stop finger 27 is provided, this stop finger or stop pin 27 being carried by a lever 26 which is adjustably secured to a clamping jaw (not shown) for the saw blade which is mounted on the machine frame and pivotable about an axis parallel to the extension of the saw blade, as is the clamping jaw 83 of the embodiment shown in FIGS. 1 to 3. The clamping jaw carrying lever 26 can be released against the action of a spring which presses the movable clamping jaw against the saw blade, by an appropriate foot lever (not shown). The pin 27 extends into the tooth gap when the clamping jaw is in closed position, whereas in open position this clamping jaw is pivoted to such an extent that the stop-pin 27 no longer extends into the tooth gap, so that the saw blade can be advanced by any of the blade-advancing means shown in FIGS. 4 to 6 or 7 to 9. In this embodiment the blade advancing means is however moved by an appropriate hand lever. The stop pin 27 is adapted to engage the front cutting edge of the tooth which has just previously been sharpened at its front cutting edge. Thus FIG. 10 shows the stop pin 27 engaging a front cutting edge situated to the right of the tool 3, and since the blade 1 moves to the right, as viewed in FIG. 10, during its advance movement between two cutting operations of the rotary tool 3, it is clear that the successive tooth gaps are presented to the tool 3 in a sequence which is the same as the cutting direction of the blade 1.

The above-described structure of FIG. 10 operates in the following manner:

By pressing the button of a first manually operated switch (not shown) a motor 112 is started in its forward direction, which motor, via a belt 113 drives the pulley 17 fixed on the spindle 8. During rotation of the spindle 8 the nut 6 is advanced to the right, as viewed in FIG. 10, so that the longitudinal carriage 2 also is shifted to the right and of course at the same time the nut 10 and the template 11 therewith are shifted to the left, as viewed in FIG. 10. As a result the carriages 2 and 4 simultaneously move toward the right, as viewed in FIG. 10 while the follower roller 14 of the lever 13 which is carried by the carriage 2 moves along the camming edge 12 of the template 11 which is moving toward the left, as viewed in FIG. 10. Therefore, the transverse carriage 4 will move transversely with respect to the longitudinally moving carriage 2.

During the shifting of the template 11, the lever 21 also turns, as a result of the cooperation of the camming edge 25 with the follower roller 24, so that the action of the lever 21 through the sleeve 20 on the collar member 22 shifts the spindle 8 to the left, as viewed in FIG. 10, in opposition to the spring 19. The curvatures of the cam 25 and the cam 12 are such that initially the movement of the spindle 8 toward the left, as viewed in FIG. 10 will be greater than the movement of the carriage 2 toward the right, with the result that the cutter 3 is capable of sharpening a concave or rearwardly inclined forward cutting edge of a tooth of the saw blade.

Thereafter, the carriage 2 will shift to the right to an extent greater than the leftward movement of the spindle 8, so that the cutter 3 will advance along the tooth profile, and the curvature of the camming edge 12 is such that after the tool 3 initially moves into the tooth gap to the throat edge thereof, the tool 3 will, after first sharpening the front edge of a saw tooth and then the throat edge of the gap, move along the back edge of the tooth which has just previously been sharpened at its front cutting edge which is engaged by the stop in 27. Thus, it is the back edge of the tooth whose front edge has just previously been sharpened which is the last to be engaged by the cutting tool 3 which advances to the right, as viewed in FIG. 10, along the back edge of this latter tooth.

The combination of controls provided for the movements of the carriages 2 and 4 will displace the cutter 3 along a path coinciding with the desired tooth profile, and of course in each tooth gap the tool 3 will tend to roll along the edge which it engages and will advance along the tooth profile in the cutting direction of the saw blade.

After the tool 3 has reached the tip of the tooth whose front edge was just previously sharpened during the previous operating cycle, the drive motor 112 is automatically stopped by an electric switch 114 which is operated by a dog 115 arranged together with another dog 116 on a rod 117 connected to the template 11. Pressure oil is subsequently fed by means of a manually-operated piston pump (not shown) into a hydraulic cylinder 118 so that this hydraulic cylinder 118 lifts the transverse carriage. The motor 112 is started again by means of a second manually-operated switch in the reverse direction so that the rotary tool 3 returns, as shown in FIG. 10, to the left to its initial position, where the motor 112 is again stopped by a switch 119 operated by the dog 116. Thereupon, the hydraulic cylinder 118 is again relieved of the pressure so that the transverse carriage 4 goes down until the pin 16 rests on the lever 13.

During the return movement of the tool 3 and after the clamping jaw has been opened by the foot lever, the blade 1 can be manually shifted to the right with the aid of the blade-advancing means in order to situate the next tooth gap in a position for receiving the tool 3. Just before the saw tooth to be worked on is situated in the position to receive the tool 3, the clamping jaw carrying the pin 27 is pivoted in the direction toward the saw blade by releasing the foot lever such that the pin 27 extends into the new tooth gap and the cutting edge which has just been worked on, abuts the stop-pin 27 which determines the exact correlation of the tooth gap to be worked on with the tool 3. The foot lever is then completely released so that the blade is again clamped. By pressing the first manually operated switch, the motor 112 is again energized to drive the spindle in its normal direction of rotation and to cause the tool 3 to cut another tooth gap.

The foregoing disclosure relates only to preferred embodiments of the invention, which are intended to include all changes and modifications of the examples described within the scope of the invention as set forth in the appended claims.

What I claim is:

1. In a process for sharpening the teeth of a saw blade, the steps of situating a rotary sharpening tool whose aixs is perpendicular to the saw blade in a tooth gap defined by the front cutting edge of one tooth, a throat edge of said gap, and the back edge of the adjacent tooth which is situated in front of the cutting edge of said one tooth, continuously moving said tool in only one direction sequentially along and in contact with said front edge, said throat edge, and said back edge, to sharpen the saw blade at said edges, while rotating said tool in a direction in which it tends to roll along said edges, maintaining said blade stationary while said tool is in contact therewith, and, after said tool moves beyond said back edge, displacing said blade in the same direction in which it moves during cutting, to an extent sufficient to situate the next tooth gap in a position to receive said tool for sharpening the front, throat, and back edges of said next tooth gap.

2. In a process as recited in claim 1, returning said tool from said back edge to a predetermined initial position, and advancing said blade to situate said next gap in a position to receive said tool simultaneously with the return of said tool to said initial position thereof.

3. In an apparatus for sharpening the teeth of a saw blade, moving means for moving a rotary sharpening tool, which has an axis perpendicular to the saw blade and which tends to roll along the surface which it contacts, along and in contact with a tooth profile which determines the configuration of the gap between a pair of teeth and which includes the front cutting edge of one tooth, a throat edge of said gap, and the back edge of the adjacent tooth which is situated in front of the cutting edge of said one tooth, said moving means continuously advancing said tool in only one direction from an initial position sequentially along said front edge of said one tooth, said throat edge, and said back edge of said adjacent tooth and subsequently returning said tool to said initial position along a path different from that taken by said tool during sequential movement along said front, throat, and back edges, blade-clamping means holding said blade stationary while said tool contacts said blade, and blade-advancing means for shifting said blade in the same direction in which it moves during cutting, to an extent sufficient to situate the next tooth gap in a position to receive said tool, after said tool has been moved by said moving means beyond said back edge of said adjacent tooth, and simultaneously with the return of said tool to said initial position.

4. In an apparatus as recited in claim 3, reciprocating means operatively connected to said tool for reciprocating the latter back and forth along its axis while it engages said saw blade.

5. In an apparatus as recited in claim 3, said moving means including a longitudinal carriage movable longitudinally of said blade, a transverse carriage movable transversely of said blade and carried by said longitudinal carriage, said transverse carriage carrying said tool, and a camming assembly controlling said carriages for moving said tool along said tooth profile.

6. In an apparatus for sharpening the teeth of a saw blade, moving means for moving a rotary sharpening tool, which has an axis perpendicular to the saw blade and which tends to roll along the surface which it contacts, along and in contact with a tooth profile which determines the configuration of the gap between a pair of teeth and which includes the front cutting edge of one tooth, a throat edge of said gap, and the back edge of the adjacent tooth which is situated in front of the cutting edge of said one tooth, said moving means continuously advancing said tool from an initial position sequentially along said front edge of said one tooth, said throat edge, and said back edge of said adjacent tooth and subsequently returning said tooth to said initial position, blade-clamping means holding said blade stationary while said tooth contacts said blade, and blade-advancing means for shifting said blade in the same direction in which it moves during cutting, to an extent sufficient to situate the next tooth gap in a position to receive said tool, after said tool has been moved by said moving means beyond said back edge of said adjacent tooth, and simultaneously with the return of said tool to said initial position, said moving means including a longitudinal carriage movable longitudinally of said blade, a transverse carriage movable transversely of said blade and carried by said longitudinal carriage, said transverse carriage carrying said tool, and a camming assembly controlling said carriages for moving said tool along said tooth profile, said moving means further including a rotary threaded spindle having a pair of threaded portions and respectively carrying a pair of nuts on said threaded portions thereof, said threaded portions having with respect to each other a relationship which simultaneously moves said nuts apart from each other during rotation of said spindle in one direction, one of said nuts being fixed to said longitudinal carriage so that rotation of said spindle acts through said one nut on said longitudinal carriage to longitudinally shift the latter, a lever pivotally carried by said longitudinal carriage and engaging said transverse carriage for controlling the movement of the latter, and an elongated template which is shiftable longitudinally of said blade and which is fixed to the other of said nuts, said template having a camming edge which forms part of said camming assembly and which is engaged by part of said lever to control the turning thereof during longitudinal movement of said template and longitudinal carriage so as to regulate the movement of said transverse carriage during longitudinal movement of said longitudinal carriage.

7. In an apparatus as recited in claim 6, the path of movement of said longitudinal carriage and the path of movement of said transverse carriage including between themselves an angle of less than 90 degrees so that said sharpening tool can be moved along a front cutting edge which is rearwardly inclined.

8. In an apparatus as recited in claim 6, said moving means including a structure operatively connected to said spindle for axially advancing the latter in a direction opposite to that in which said longitudinal carriage is moved by cooperation of said spindle and said one nut.

9. In an apparatus as recited in claim 8, said structure for axially advancing said spindle including a second lever having a stationary turning axis and having one arm engaging said spindle, said second lever having a second arm, and said template having a second camming edge forming part of said camming assembly and engaging said second arm of said second lever for turning the latter during longitudinal movement of said template to turn said second lever in a direction which displaces said spindle axially in said direction opposite to that in which said longitudinal carriage moves.

10. In an apparatus as recited in claim 5, said camming assembly including a rotary shaft carried by said longitudinal carriage and extending perpendicularly to said blade, a pair of cams fixed to said rotary shaft for rotation therewith, a stationary roller engaging the periphery of one of said cams for controlling the movement of said longitudinal carriage, a motion-transmitting structure extending between and operatively engaging the other of said cams and said transverse carriage for controlling the movement of said transverse carriage in response to rotation of said other cam, and means acting on said carriages for maintaining said one cam in engagement with said stationary roller and said motion transmitting structure in engagement with said other cam and said transverse carriage.

11. In an apparatus as recited in claim 3, an adjustable stop for limiting the extent of movement of said blade-advancing means to a distance which will position the next tooth gap at a location for receiving the sharpening tool.

12. In an apparatus for sharpening the teeth of a saw blade, moving means for moving a rotary sharpening tool, which has an axis perpendicular to the saw blade and which tends to roll along the surface which it contacts, along and in contact with a tooth profile which determines the configuration of the gap between a pair of teeth and which includes the front cutting edge of one tooth, a throat edge of said gap and the back edge of the adjacent tooth which is situated in front of the cutting edge of said one tooth, said moving means continuously advancing said tool from an initial position sequentially along said front edge of said one tooth, said throat edge, and said back edge of said adjacent tooth and subsequently returning said tool to said initial position, blade-clamping means holding said blade stationary while said tool contacts said blade, and blade-advancing means for shifting said blade in the same direction in which it moves during cutting, to an extent sufficient to situate the next tooth gap in a position to receive said tool, after said tool has been moved by said moving means beyond said back edge of said adjacent tooth, and simultaneously with the return of said tool to said initial position, said blade-advancing means including a stop pin for limiting the extent to which the blade is moved by said blade-advancing means to an amount which will position the next tooth gap at a location for receiving the sharpening tool, said stop pin engaging the front cutting edge which has just previously been sharpened in order to limit the extent of movement of the blade by said blade-advancing means.

13. In an apparatus for sharpening the teeth of a saw blade, moving means for moving a rotary sharpening tool, which has an axis perpendicular to the saw blade and which tends to roll along the surface which it contacts, along and in contact with a tooth profile which determines the configuration of the gap between a pair of teeth and which includes the front cutting edge of one tooth, a throat edge of said gap and the back edge of the adjacent tooth which is situated in front of the cutting edge of said one tooth, said moving means continuously advancing said tool from an initial position sequentially along said front edge of said one tooth, said throat edge, and said back edge of said adjacent tooth and subsequently returning said tool to said initial position, blade-clamping means holding said blade stationary while said tool contacts said blade, and blade-advancing means for shifting said blade in the same direction in which it moves during cutting, to an extent sufficient to situate the next tooth gap in a position to receive said tool, after said tool has been moved by said moving means beyond said back edge of said adjacent tooth, and simultaneously with the return of said tool to said initial position, said blade-advancing means including a pair of clamping members respectively situated on opposite sides of the saw blade, and a supporting member for said clamping members, said clamping members being biased in a direction opposite to that in which said supporting member moves during shifting of the saw blade to clamp the saw blade between said clamping members by wedging action, said saw blade being released when said supporting member returns to its initial position.

14. In an apparatus as recited in claim 13, said blade-advancing means including a pair of clamping rollers respectively situated on opposite sides of the saw blade and respectively having peripheral portions directed toward each other and engaging opposed faces of the saw blade in a clamping position of said rollers, a pair of roller shafts respectively fixed coaxially to and extending from said rollers, and a roller-supporting assembly carrying said rollers, said assembly including a pair of elongated edges respectively engaging peripheral portions of said roller which are opposed to the peripheral portions thereof which engage the blade in the clamping position of said rollers, said elongated edges of said roller-supporting assembly diverging away from each other in the direction in which said assembly moves during shifting of the saw blade, and said assembly including a pair of elongated grooves extending parallel to said edges, respectively, and receiving portions of said shafts.

15. In an apparatus as recited in claim 14, a blade-centering block situated centrally of said roller-supporting assembly and guided for longitudinal movement therealong, said block having transverse groove portions which are aligned with each other and which receive portions of said shafts, said transverse groove portions extending along a line which is perpendicular to the saw blade, and spring means connected to said block for urging the latter in a direction opposite to that in which the said roller-supporting assembly moves during shifting of the saw blade, so that said latter spring means urges said block with respect to said roller-supporting assembly in a direction which displaces said rollers to their clamping position engaging the saw blade 16. In an apparatus as recited in claim 13, said blade-advancing means including a clamping-lever support, and a pair of clamping levers respectively situated on opposite sides of the saw blade and pivotally carried by said support for turning movement in a common plane which is perpendicular to the saw blade, said levers having free, curved clamped edges which engage and press against opposed faces of the saw blade during movement of said support in the blade shifting direction and which automatically release the saw blade during movement of said support in the reverse direction.

17. In an apparatus as recited in claim 16, a pair of shafts carrying said levers and supported for turning movement by said support, a pair of gear sectors respectively carried by said shafts and meshing with each other, and a pair of torsion springs respectively acting on said levers for urging the latter to turn in a direction where said levers will clamp against a saw blade, said gear sectors maintaining said saw blade positioned centrally with respect to said clamping levers.

References Cited by the Examiner
UNITED STATES PATENTS

| | | | |
|---|---|---|---|
| 187,921 | 2/1877 | Smith | 76—44 |
| 2,379,642 | 7/1945 | Kiechle | 76—44 |

GRANVILLE Y. CUSTER, JR., *Primary Examiner.*